United States Patent Office

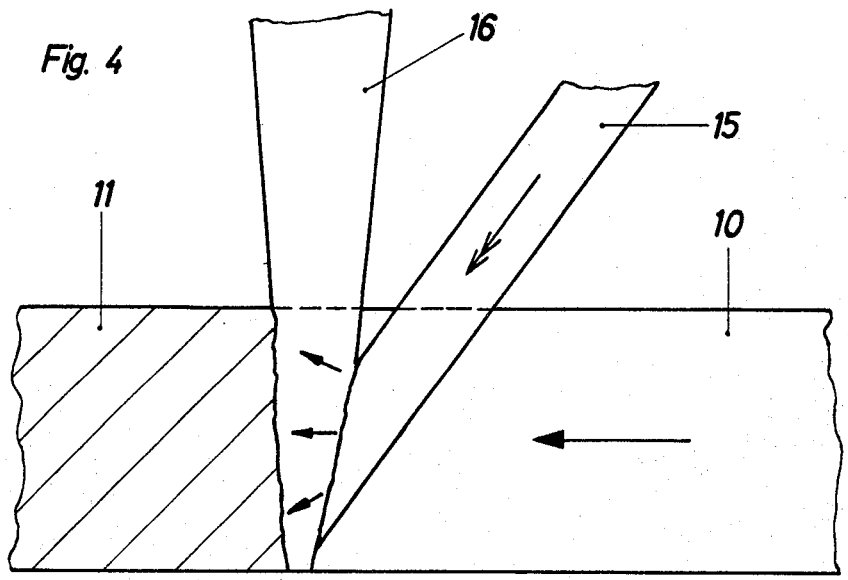
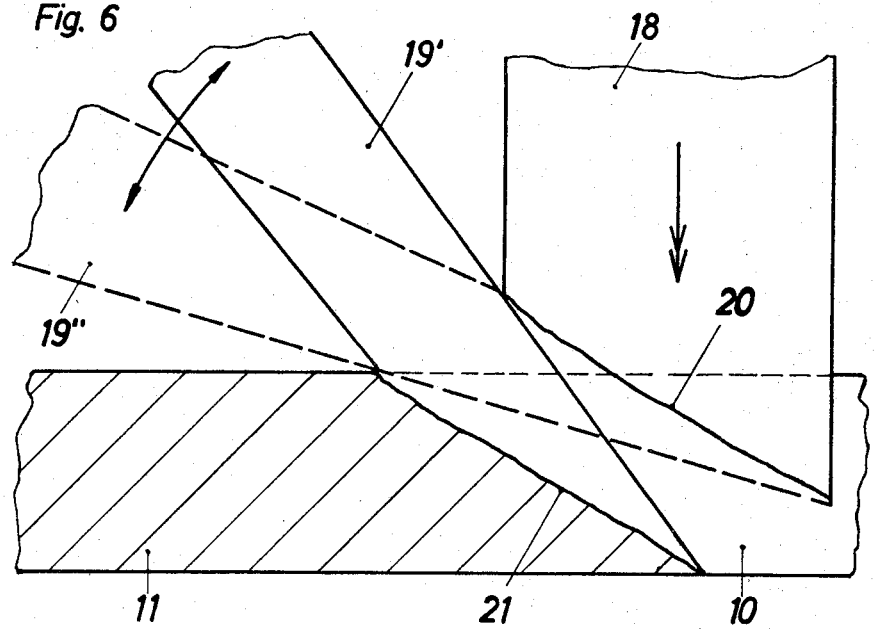

3,417,223
Patented Dec. 17, 1968

3,417,223
WELDING PROCESS USING RADIANT ENERGY
Karl Heinz Steigerwald, Schubertstrasse 8,
Heidenheim, Germany
Filed May 4, 1965, Ser. No. 453,013
Claims priority, application Germany, May 6, 1964,
St 22,089
17 Claims. (Cl. 219—121)

ABSTRACT OF THE DISCLOSURE

A welding process is described wherein an energized beam such as a beam of electrons is used to weld a material with a preheated filler material. The filler material is supplied to the welding zone but without heat-conducting relationship therewith. The preheating of the filler material is obtained by either an independent supply of heat or by the energized beam in a controllable manner. The filler material is preferably so positioned relative to the weld and the energized beam to partially intersect the beam whereby the preheated portions of the filler material are permitted to merge into the weld area to provide a weld free from irregularities such as voids, cracks and the like.

---

This invention relates to welding and, more particularly, relates to an improved welding process using radiant energy.

It is known that radiant energy, and especially electron beams, can be used for heating material for the purposes of drilling, removing material, soldering, welding and other machining operations. In election beam welding, as for example, in the production of straight welds, the joints of the parts to be welded are brought as closely together as possible. The electron beam is then moved along the joint visible on the surface in order to join the parts over the desired depth by fusion and welding.

Energy is distributed from the impingement point of the beam into the zone to be welded due to the thermal conductivity of the base material and, if the energy density of the impinging beam is sufficiently high, by direct transfer of electron beam energy from the penetrating beam (commonly referred to as "deep welding").

Experience has shown that the welding process described here has a number of considerable practical drawbacks. Above all the close contact between the surfaces to be welded is a condition which can be satisfied only in special cases. In principle, the design of the contact zone is a matter of machining accuracy. In the past, electron beam welding could frequently not be applied because it demands a degree of accuracy in the design and preparation of the weld zone which is not normally required for the workpiece, resulting in increased preparation costs.

The particular sensitivity of the electron beam technique to cracks or other cavities, such as blowholes, in the zone of irradiation is due to the process of energy transformation accompanying the heating of the workpiece. In the cavities, no energy is transformed and, thus, no heat generated. This reduces the total heat in the section being welded at the moment. At the same time, the excessive, unused beam energy leads to loss of material, above all in the region of the emergent beam, due to local overheating and spraying giving rise to notching as well as other undesirable phenomena. Similar disturbances will be encountered if there are inclusions of foreign matter or other inhomogeneities in the weld zone.

Another disadvantage of deep penetration welding is due to the conditions under which the deep welding effect proper is achieved. High vapor pressure must be produced in the irradiated area, which in most cases requires temperatures far above the melting point of the welded base metal. As a consequence, material is lost due to escaping vapor and spraying, blowholes are formed, and changes occur in the material. This process also requires a relatively high minimum speed of welding which may lead to faulty welds if disturbances are introduced, for example, by inaccuracies or by evolution of gas, which cannot balance out in the short time available or which cannot be observed and corrected. This circumstance reduces the practical value of electron beam welding techniques quite considerably.

Up to now, the electron beam process cannot be employed when there are big, and especially irregular gaps between the surfaces to be joined. Attempts have been made to fill such gaps, for example, by inserting strips of sheet metal, granular, pulverulent or similar material, and to join them. However, uncontrollable practical difficulties were encountered, among other things due to the unavoidable cavities and the rapid motions of material which are required to fill these cavities, during the high speed welding process.

An object of the present invention is to provide a welding process using radiant energy, which excludes the aforementioned disadvantages while it makes full use of the advantages offered by intensive, local application of radiant energy.

Another object of the present invention is to provide a welding process suitable for welding of irregular or ragged edges together using an intense beam of radiant energy.

In the welding process using radiant energy covered by the present invention, one or more welding areas are heated at least to the required welding temperature with the aid of the radiation, while additional material is simultaneously heated by a heating process independent of the weld heating process and brought into contact with the preheated weld areas in solid, liquid or vaporous state. Contrary to conventional electron beam welding techniques, additional material is thus used, which is brought into contact with the weld area only during the welding process proper. In this manner, it is possible to adapt the supply of material to the conditions at the weld area and, thus, to avoid disturbances.

It is known to use with gas and arc welding processes continuously fed filler metal. However, the supply of energy by the flame or the arc differs essentially from the supply of energy in the radiation technique. Both the flame and the arc are hot media expanding essentially according to the laws of gas flow, thus, flowing around practically any bounding surface within a certain closed space, and heating it up. Consequently, it is not difficult to melt also the filler metal in the hot zone in which the joints of the workpieces are heated, and to apply it to the weld.

Conditions are completely different in the case in which energy is supplied in the form of radiation. In spaces where no optical refraction occurs, radiation travels along a straight line. Its special advantage for thermal machining, and particularly for welding, consists in the process of practically inertia-free heating of the area of the workpiece struck by it as well as in the accuracy with which the heating effect can be localized to this area. In this way, the most essential advantages of electron beam welding are obtained, viz. low expense of specific welding heat with all its favorable consequences. On the other hand, the process of fusion welding is limited to this sharply defined region. This fact imposes fundamental conditions on the method employed for the supply of additional material. This supply must, in principle, be made in such manner as to preserve the mean power density of the radiation required for maintaining the welding temperature at the weld.

As was mentioned above, the additional material is to be heated independently of the heating process for the weld. Thus, it is e.g. possible to heat the additional material by means of an arc or a corpuscular beam and to apply it to the weld in the form of vapor or tiny droplets. This has only a negligible effect on the radiation striking the weld, so that the aforementioned condition for the application of additional material to the weld can be satisfied.

The same beam can advantageously be used for heating the weld and the additional material. In this case, the additional material is preferably heated in a section of the ray path from which radiation is not or only partially transmitted to the welds. However, it may also be advisable to heat the additional material by introducing a relative movement of the beam and the additional material, so that at least part of the beam covers the additional material temporarily or at intervals.

If in the new process the additional material is introduced in the solid state, the heating process is arranged so that the temperature at the melting point of the additional material is higher than the temperature at the welds. For this purpose, the additional material is so designed and inserted into the beam heating one or more welds that its surface melted by the beam subtends an angle of less than 180°, preferably an acute angle, with at least one part of at least one of the welded surfaces. This ensures that with an appropriate temperature gradient between melting point and weld the additional material is conveyed to the weld as completely as possible and on the shortest possible way.

Thus, it is, for example, possible to supply the additional material at a speed which guarantees the required power density of the beam at the point where this material is being melted.

By means of the new process it is, for example, possible to weld a layer of additional material onto a workpiece. For this purpose, the workpiece and the beam must be moved one with respect to the other while continuously adding additional material. In this process, only a thin layer of the workpiece is heated to welding temperature, and the amount of additional material which is liquified will correspond exactly to the amount required at the weld.

It is also possible to perform the welding of additional material by rolling flexible additional material onto the workpiece, whereby the radiation heats a layer of the additional material and the workpiece at the advancing point of contact to welding temperature.

The new process has a particularly advantageous application in welding two workpieces together along a seam. For this purpose, the workpieces are positioned adjacent each other. The surfaces to be welded may be separated by a small gap. The additional or filler material is introduced into the gap. The beam is then switched on and the beam moved along the seam while the filler is fed continuously into the gap. The filler feed and beam traverse is controlled to fill the entire gap with a material in a pass along the seam.

In this operation, the beam is directed onto the workpieces so that its outer zone strikes the sides of the gap tangentially and heats them to welding temperature. For filling and welding the gap, additional material is then introduced into the gap so that it is struck by part of the beam and highly heated. By or under the effect of temperature, this highly heated material is then moved on the shortest way in the direction of the sides of the gap, heated to welding temperature by the beam, and the previously closed sections of the gap.

At the beginning of the welding process, the gap may, although it need not, be interrupted by points of contact along and across the surfaces to be joined, e.g. edges shoulders, transverse webs or a tapering shape of the gap. The additional material should preferably be inserted into the gap in the form of a wire or a tape.

There are several possibilities for inserting the additional material into the gap. For example, the additional material can be inserted so that it will not touch the joint. In this case, the beam is controlled so that it heats the melted surface to a higher temperature than the weld area. The highly heated additional material is then transported to the weld area by the effect of temperature, and the gap is filled during the relative motion of beam and workpiece.

The required temperature difference can be obtained by displacing the radiation or the additional material in such a manner that the beam passes more slowly over the additional material than over the weld area.

It is also possible to insert the additional material into the center of the gap and to move the radiation periodically in such manner that it strikes primarily alternately to both sides of the additional material, melting the additional material and the base metal simultaneously. The additional material is here melted and flows essentially around the radiation onto the surfaces to be welded. This process is particularly advisable if the surfaces to be joined are very irregularly shaped.

The additional material can also be introduced into the gap so that it touches the gap side of a workpiece. In this case, the power density of the radiation is made high enough for the additional material to be melted at the weld, while at the same time the material at the weld area is heated to welding temperature. Here also the molten additional material flows onto the weld area.

Furthermore, the additional material can be inserted into the gap so that it touches the joint of the workpieces. In this case, the power density of the radiation is made high enough for the additional material and the base material to be melted simultaneously at the weld area. Thus, liquified additional material is continuously available at the joint, which may penetrate into any irregularities in the surfaces to be joined.

The same effect can be obtained if the additional material is introduced into the gap so quickly that there will arise at the welding point a layer of molten material which always fills up the gap. In order to obtain a perfect weld, it is then necessary to choose the power density of the radiation so high that it will penetrate into the liquified metal.

Under certain circumstances, and particularly when very thick workpieces are to be welded, it is advantageous to control the supply and melting of the additional material in such manner that the amount of additional material melted is not sufficient to fill the gap completely, and to fill the gap by successive passes of the beam over the gap layer by layer.

The additional material cannot only be applied to the weld area in the solid state, but it may also be of advantage for certain welding problems to apply the additional material to the weld area in granular or vaporous form or in the form of droplets.

Particularly for welding a layer onto a workpiece, it may be useful to apply the additional material in partly liquified form to the weld area.

In many cases, it will be advantageous to accelerate the additional material heated to welding temperature on its way to the weld area. This can, for example, be achieved by applying an electric field between the additional material and the workpiece.

Under certain conditions, it may also be advisable to apply the additional material at intervals to the weld area or, if there are several weld areas, to apply the additional material successively to the weld areas or sections thereof.

In order to facilitate the flow of additional material onto the weld areas, it is advisable to direct the radiation onto the vertically moving workpieces from an essentially horizontal direction.

The radiation used in the process covered by this invention is, for example, a corpuscular beam focused on the weld area, preferably an electron beam, or a high energy light beam (laser beam).

Having briefly described the present invention, it will be described in greater detail in the following portions of the specification, which may best be understood with reference to the accompanying diagrammatic drawings, of which:

FIG. 4 is a sectioned view along the two workpieces to be welded together and shows the heating of the weld and the additional material by one beam;

FIG. 6 is a sectioned view along the gap of two workpieces to be welded together and shows the heating of the weld and the additional material by a moving beam;

Figure 1:
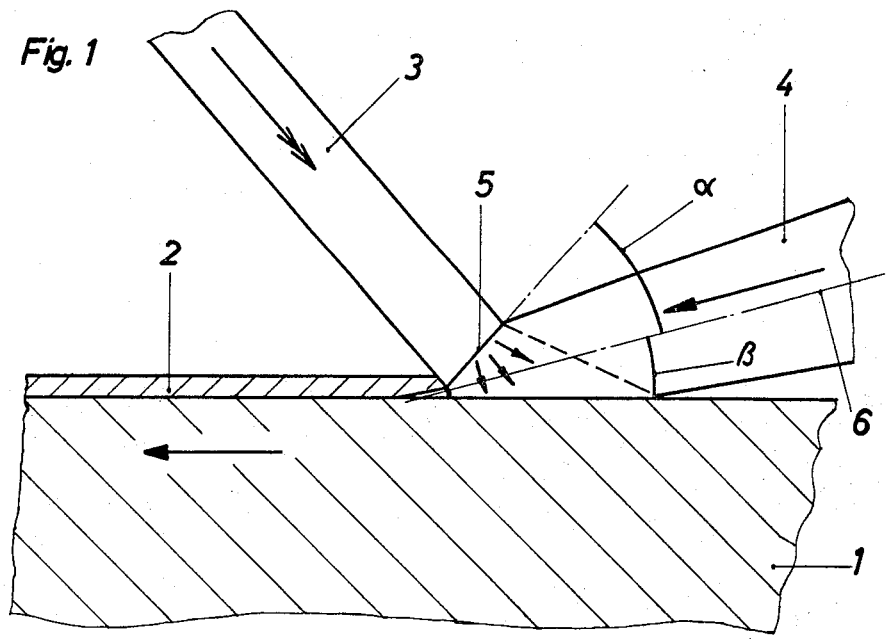
FIG. 1 is a partially sectioned side view of a workpiece onto which a layer is to be welded.

In FIG. 1, there is shown a workpiece 1 onto which a layer 2 of additional material is to be welded. For this purpose, the additional material is applied to the weld in the form of a wire or a tape 3. A bundle of rays, for example, an electron beam 4, heats a certain area of the workpiece to welding temperature and simultaneously melt the layer of additional material which is directly impinged by the beam. The direction of the beam 4 is so chosen that its axis 6 makes an angle $\alpha$ with the melting surface 5, which is larger than the angle $\beta$ made by the axis 6 with the surface of the workpiece 1. As a result, the temperature of the melting surface 5 is higher than that of the workpiece surface struck by the beam. This temperature difference causes the highly heated and molten additional material to move towards the workpiece where it forms the layer 2.

During the welding process, the workpiece 1 is displaced in the direction of the arrow, additional material is continuously fed in the direction of the double-headed arrow, and the beam 4 remains stationary. The layer 2 is thus formed continuously on the workpiece 1.

If the workpiece 1 is very wide and if it is to be completely covered with a layer 2, it is advisable to feed additional material in the form of a tape as wide as the workpiece. In this case, the beam 4 carries out an oscillatory motion perpendicular to the plane of the drawing.

Figure 2:
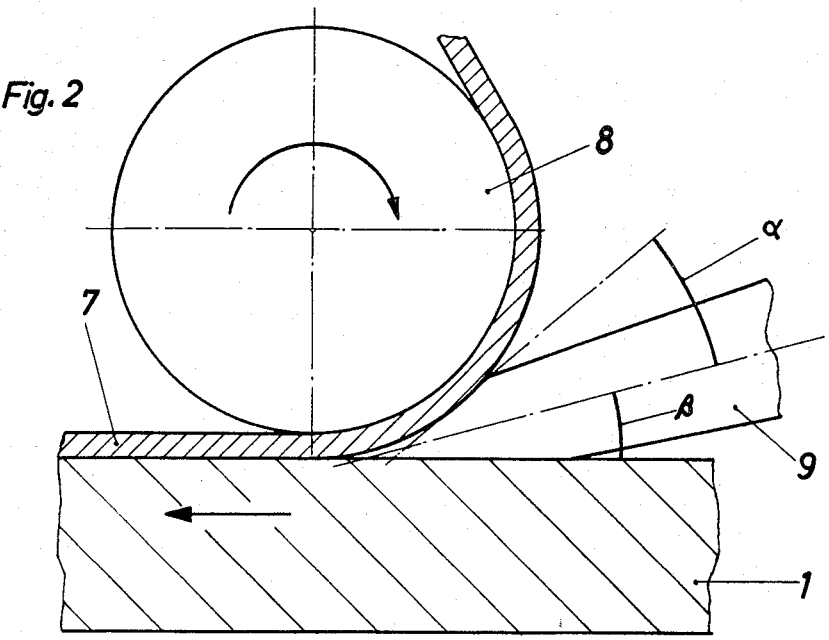
FIG. 2 is a partially sectioned side view of a workpiece onto which additional material in the form of a tape is to be welded.

In FIG. 2, a layer of additional material is likewise to be welded onto a workpiece 1. Here, the additional material has the form of a flexible tape 7. This tape is rolled onto the workpiece 1 by means of a roller 8. During this operation, the point of contact between tape 7 and workpiece 1 is continuously struck by a beam 9. The latter heats the struck layer of additional material 7 and of the workpiece to welding temperature, so that continuous perfect fusion is obtained when the tape is rolled down.

The angle $\alpha$ can be larger, equal to or smaller than the angle $\beta$. This depends only on the effectiveness with which the layers struck by the beam are cooled.

Should, for example, an electron beam 9 be used and should the welding process be carried out in vacuum, the cooling of the workpiece layer struck by the beam will normally be more intensive than the cooling of the tape 7 due to the transfer of heat to other, not directly heat-affected zones of the material. Consequently, the angle $\beta$ should in this case be larger than the angle $\alpha$, i.e. the workpiece 1 should receive more energy than the tape 7. In spite of this, the temperature situation will remain unchanged, i.e. the layer of the tape 7 which is struck by the beam will become hotter than the corresponding layer of the workpiece.

Figure 3:
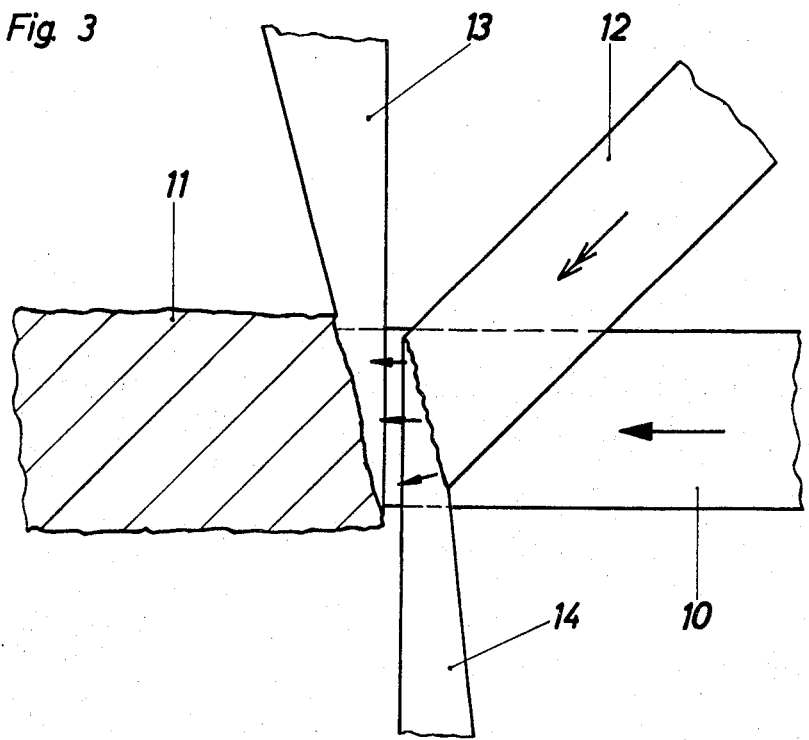
FIG. 3 is a sectioned view along the gap of two workpieces to be welded together and shows the heating of the weld and the additional material by two independent beams.

In FIG. 3, 10 denotes the gap surface of a workpiece opposite the gap surface of another workpiece not visible in the drawing, with which it is to be joined. 11 denotes the portion of the gap between the workpieces which has already been closed by solidified additional material. Additional material in the form of a wire of tape 12 is introduced into the open gap. This additional material is melted by a beam 14 incident from below. A beam 13 incident from above serves to heat the weld area, i.e. a certain region of the workpieces to be joined at the corresponding weld. As is evident from the drawing, the melting surface of the additional material 12 is heated to a higher temperature than the weld area. Due to the temperature difference thus produced, the liquified additional material reaches the weld, e.g. in the form of a spray, where it forms a deposit.

If the workpieces are now displaced in the direction of the arrow and if additional material 12 is continuously fed in the direction of the double-headed arrow, with the beams 14 and 13 remaining stationary, the gap will be continuously filled with additional material.

The welding process should proceed in such a manner that a bead of the desired thickness is formed on the upper and lower sides of the workpieces.

In FIG. 4, only one beam 16 is used for heating the additional material 15 introduced into the gap. The additional material is melted by portions of the beam 16 which do not contribute to the heating of the weld area. In this case also, the angles $\alpha$ and $\beta$ are chosen so that the additional material is heated to a higher temperature than the weld area. Due to the difference in temperature, the liquified additional material is carried to the weld on the shortest path. If the workpieces are displaced in the direction of the arrow while additional material is being continuously fed, the gap is completely filled with additional material.

If an electron beam 16 is used, an appropriate electron-optical design will, for example, make it possible to penetrate a gap 1 mm. wide and 50 mm. deep with a beam of a power of a few kilowatts. In this case, the outer portions of the beam strike the sides of the gap tangentially and heat them to welding temperature. At the same time, other portions of the beam melt the additional material, which is carried by or under the effect of temperature in the direction of the gap sides heated to welding temperature by the beam, as well as the portions of the gap already closed.

Figure 7:
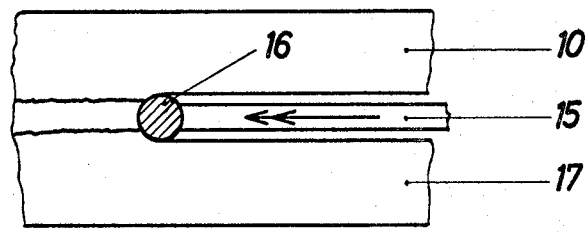
FIG. 7 is a top view of two workpieces to be welded together and shows the application of additional material.

These conditions are also evident from FIG. 7. In this figure, also the second workpiece 17 to be welded to workpiece 10 is visible. In addition, it will be noticed that the additional material 15 is located roughly in the middle of the gap. Finally, the location of the beam 16 with respect to the additional material and the workpieces can also be seen.

The liquified additional material is carried through the beam and onto the weld area in the form of droplets or vapor. In order to accelerate this movement, it may be advisable to apply an electric field between the additional material 15 and the workpieces 10, 17. The additional material is then carried to the weld area under the influence of this field.

Mention must be made of the fact that in the drawings all angles are greatly exaggerated. In reality, these angles as well as the diameter of the beam are much smaller.

Figure 5:
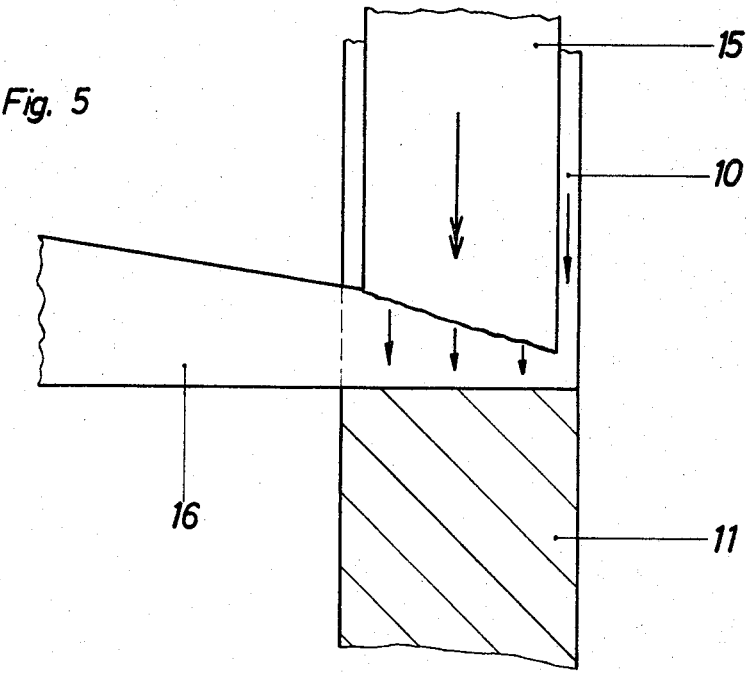
FIG. 5 is a sectioned view along the gap of two workpieces to be welded together and shows the heating of the weld and the additional material by a horizontally incident beam.

In the arrangements shown in FIG. 5, the workpieces are moved vertically, while the beam 16 follows a horizontal path. Additional material 15 is added within the gap. All other details correspond to FIG. 4, with the only difference that in the arrangement shown in FIG. 5, the force of gravity has a favorable effect on the transfer of the liquified additional material to the weld area.

The swinging motion of the beam shown in the figure can best be attained by conventional deflection of the beam in two planes.

FIGS. 7 to 10 show different possibilities for the feeding of additional material.

In FIG. 7, the additional material 15 does not touch the workpieces 10 and 17, as was mentioned before, and the heated additional material is carried through the beam to the weld area in the form of droplets or vapor.

Figure 8:
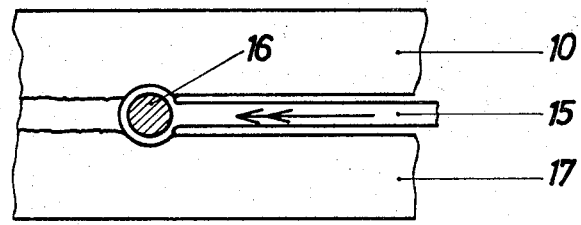
FIG. 8 is a top view of two workpieces to be welded together and shows the application of additional material in another form as illustrated in FIG. 7.

In the arrangement shown in FIG. 8, additional material 15 is so introduced into the gap that it is in contact with the section of the gap already closed. Here, the beam 16 must have sufficient power density in order to penetrate the additional material and sufficiently to heat a layer of the gap sides and of the section of the gap already closed. Consequently, there is always liquified additional material at the weld area.

Figure 9:
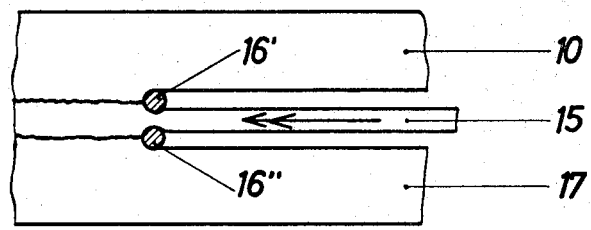
FIG. 9 is a top view of two workpieces to be welded together and shows the heating of the weld and the additional material by a deflected beam.

In the arrangement shown in FIG. 9, additional material is inserted into the middle of the gap. The beam 16 is moved so that it alternates between the positions 16' and 16", stopping for a short while in each of these positions, this stop being sufficient for melting the layer of the additional material on which it is incident, at the same time bringing the struck portions of the workpieces to welding temperature. The liquified additional material then flows around the beam 16 onto the weld area.

Figure 10:
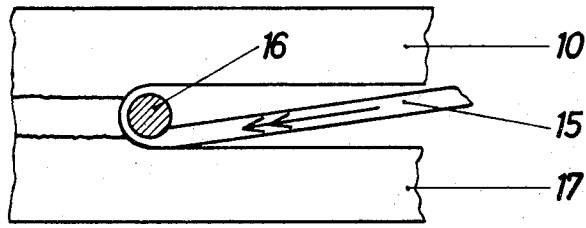
FIG. 10 is a top view of two workpieces to be welded together and shows the application and heating of the additional material which is in contact with one side of the gap.

In the arrangement shown in FIG. 10, additional material 15 is fed in such manner that it is in contact with the gap surface of the workpiece 17. The beam 16 is oriented so that it heats the weld area, liquifies the additional material and at the same time heats the gap area adjacent to the additional material to welding temperature. The liquified additional material flows around the beam 16 onto the weld area.

Figure 11:
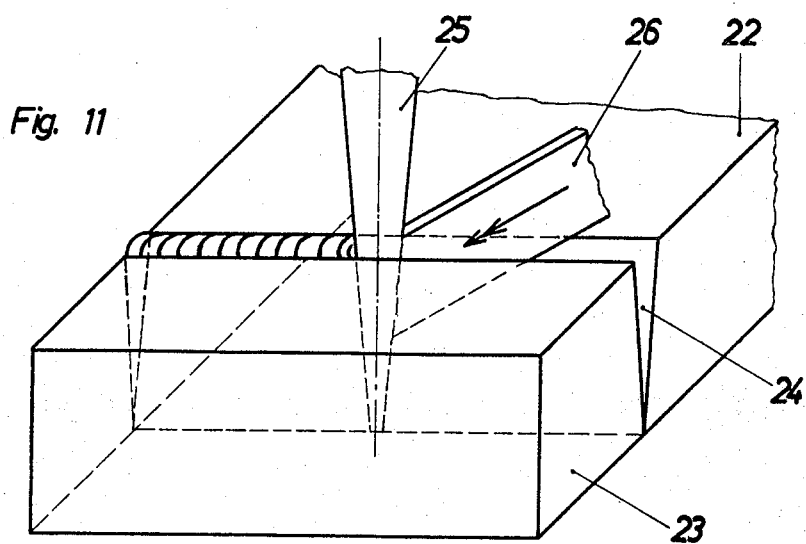
FIG. 11 is a perspective view of two workpieces to be welded together, which form a V-shaped gap.

FIG. 11 shows two workpieces 22 and 23 which form a V-shaped gap 24. The additional material 26 is introduced into this gap. The beam 25 heats the sides of the gap and liquifies the additional material which flows into the gap without any danger of molten material emerging at the underside of the gap.

Figure 12:
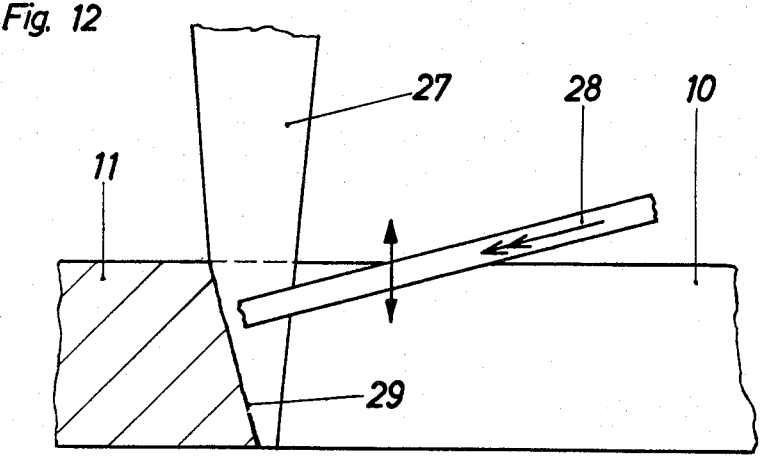
FIG. 12 is a section along the gap of two workpieces to be welded together and shows the heating of additional material reaching different points of the weld at different times.

FIG. 12 shows again a section through the gap of two workpieces 10, 17 to be welded together. Here, additional material is introduced into the gap in the form of a wire 28. The beam 27 heats the weld to welding temperature and liquifies the section of the wire 28 it strikes. During the welding process, the latter is displaced in the direction of the double-headed arrow. The additional material thus comes consecutively into contact with different portions of the weld 29. The gap is, thus, filled from bottom to top, with only a small amount of liquified additional material being available at any time during the operation. This type of welding is recommended above all for wide and deep gaps.

Figure 13:
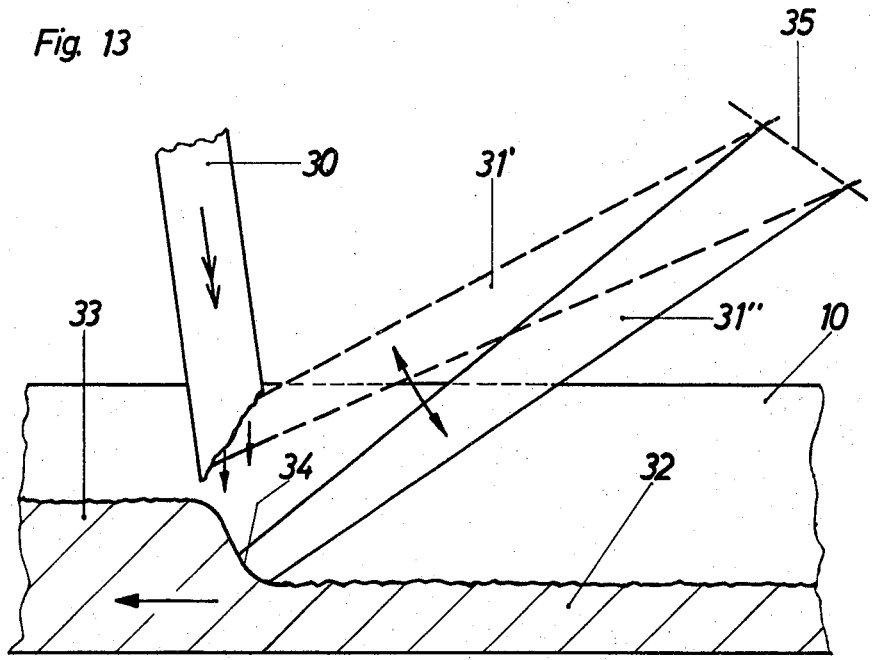
FIG. 13 is a section along the gap of two workpieces to be welded together and shows the filling of the gap in layers.

FIG. 13 shows a section through the gap of two workpieces 10, 17 to be welded together. The additional material is here marked 30. The beam oscillates rapidly about a pivot in the deflection plane 35 and alternates between the positions 31' and 31". In the position 31', the beam strikes the additional material 30 where it removes material by melting. The amount of material molten does not suffice for filling the gap completely. Only a layer of additional material solidifies in the gap. Such a layer is marked 32.

In the position 31", the beam is incident on the weld area 34 where it heats the material to welding temperature. The oscillation of the beam is controlled so that it stops longer on the additional material than on the weld. A sufficient amount of material is, thus, melted to form a layer of the desired thickness in the gap. The liquified additional material is transferred to the weld by the force of gravity.

In the arrangement shown in FIG. 13, a first pass has formed the layer 32 in the gap. In the course of the second pass shown in the figure, during which the workpieces and the additional material are displaced in the directions of the arrows, another layer 33 is formed. Further passes follow, until the gap is completely filled with additional material.

A similar arrangement according to FIG. 13 is illustrated in FIG. 6 wherein again a beam 19 performs a swinging movement in such manner that it alternatively takes the positions 19" and 19'. In the position 19', the beam heats the welding spot 21 above the welding temperature, and in the position 19" the beam impinges on the melting surface 20 of the filler material 18. The movement of the beam is controlled so that it impinges on the filler material 20 for a longer time than on the welding spot, thus heating the filler material to a higher temperature than the welding spot. By the temperature differential and under the supporting influence of gravity, the filler material moves to the welding spot.

The same effect, which is attained by a controlled stoppage of the beam on the weld area and on the additional material, can also be produced if the stoppage times are kept constant but the power or the focusing characteristics of the beam varied in the two different positions. It is also possible to use a pulsed beam with different pulse durations in the two positions of the beam.

Figure 14:
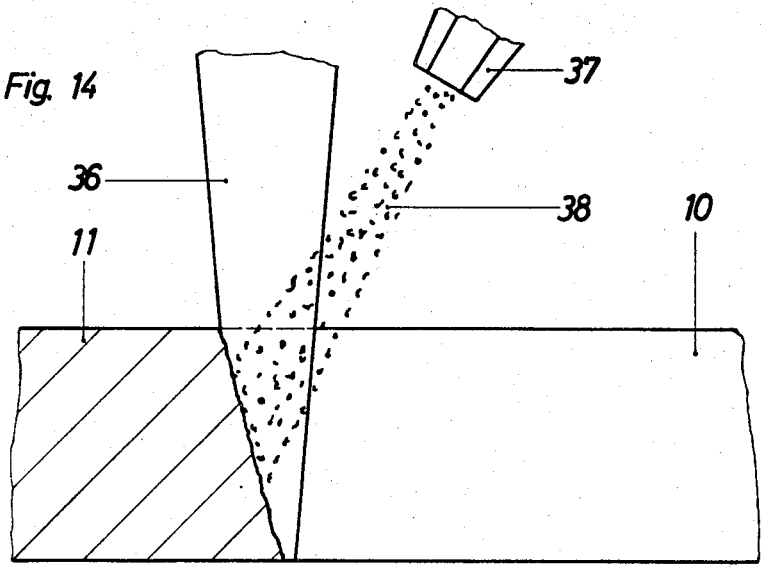
FIG. 14 is a section along the gap of two workpieces to be welded together and shows the application of granular additional material to the weld.

FIG. 14 shows a beam 36 serving to heat the weld area. A nozzle 37 is provided through which pulverulent or granular additional material 38 is expelled in the direction of the weld. Flow of material can, for example, be produced or augmented by applying a positive bias to the nozzle 37 in relation to the workpiece 10.

On its way to the weld area, the additional material 38 passes through the beam, where it is melted.

This invention may be variously modified and embodied within the scope of the subjoined claims.

What is claimed is:

1. A method for welding material using an energized beam comprising,
   continuously feeding a filler material to a position adjacently spaced from the weld area of the material to be welded substantially without heat-conducting relationship therewith,
   directing an energized beam at the weld area to raise the weld area to a desired welding temperature,
   preheating the filler material portion adjacently spaced from the weld area to a temperature near the welding temperature substantially without reliance upon heat conduction from the weld area,
   moving the workpiece and the energized beam relative to one another, and,
   merging the preheated filler material portion into the weld area to form a fusion weld in the material.

2. The method of claim 1 in which at least the additional material is rolled down onto the weld area, both said weld area and said additional material being brought to welding temperature at the advancing point of contact by means of the energized beam.

3. The method of claim 1 in which, for welding together two workpieces along a seam, said workpieces are brought close to each other with a gap therebetween, the additional filler material is continuously inserted into the gap so that it does not come into contact with the corresponding joint and that its surface melted by the energized beam is heated to a higher temperature than the weld area, said workpieces being displaced in relation to the direction of the energized beam so that said gap is progressively filled with the filler material in the direction of the seam.

4. The method of claim 3 in which the workpieces are guided horizontally, the additional material being introduced into the gap from above in the form of a wire or a tape and the energized beam being moved back and forth between the weld area and the additional material.

5. The method as recited in claim 1 in which the filler material preheating step comprises,
applying an electric arc to said adjacently spaced filler material to raise the temperature thereof.

6. The method as recited in claim 1 in which the preheating step comprises,
feeding the filler material portion adjacently spaced from the weld area with intersecting relationship with a predetermined cross-sectional portion of the energized beam,
and wherein the beam-directing step comprises,
directing the remaining portion of the energized beam that is not intersected by the filler material to heat the welding area to the desired temperature.

7. The method as recited in claim 6 wherein the energized beam is directed at a first angle relative to the plane containing the surface of the material to be welded, and,
wherein the filler material preheating includes feeding a solid filler material along a path intersecting the energized beam with the path forming a second angle with the beam and a third angle with said material surface,
said angles being selected to distribute the power in the beam between the filler material and the weld area to melt the intersecting adjacently spaced portion of the filler material and raise the temperature of the weld area to the desired temperature.

8. The method as recited in claim 7 wherein said angles are selected to raise the filler material to a higher temperature than the temperature in the welding area.

9. The method as recited in claim 6 wherein the feeding speed of the filler material is selected commensurate with the beam energy intersected by the filler material to attain the desired preheating.

10. The method as recited in claim 1 wherein said preheating step comprises,
periodically bringing selected portions of the energized beam into intersecting relationship with the adjacently spaced filler material.

11. The method as recited in claim 10 wherein said energized beam is periodically moved relative to the filler material for intersection thereof, said periodic intersection being timed to impart sufficient preheating of the filler material for merger into the weld area.

12. The method as recited in claim 10 wherein said preheating step further comprises,
controlling the power and the focus of the energized beam during the intersection thereof with the filler material to control the merger of the intersected filler material into the weld area.

13. The method of claim 1 wherein the directing step comprises,
forcusing a beam of electrons on the welding area.

14. The method of claim 1 wherein the directing step comprises,
focusing a high-intensity laser beam on the welding area.

15. The method of claim 1 and further comprising,
applying a force to the filler material adjacently spaced from the weld area in a direction towards the weld area to merge the preheated filler material into the weld.

16. The method of claim 5 wherein said force-applying step includes applying an electric field between said preheated filler material and the weld area.

17. The method as recited in claim 6 and further comprising,
selecting the size of the cross-sectional portion of the beam intersected by the filler material to control the temperature of the weld area and fuse said intersecting filler material.

References Cited

UNITED STATES PATENTS

| | | | |
|---|---|---|---|
| 2,423,729 | 7/1947 | Ruhle | 219—121 |
| 3,056,881 | 10/1962 | Schwarz | 219—121 |
| 3,117,022 | 1/1964 | Bronson et al. | 219—121 |
| 3,165,619 | 1/1965 | Cohen | 219—121 |
| 3,211,883 | 10/1965 | Zimmerman | 219—130 |
| 3,219,435 | 11/1965 | Gruber et al. | 219—121 |
| 3,303,319 | 2/1967 | Steigerwald | 219—121 |

RICHARD M. WOOD, *Primary Examiner.*

W. D. BROOKS, *Assistant Examiner.*